United States Patent [19]

Frantz

[11] 4,029,486

[45] June 14, 1977

[54] PNEUMATIC COMPACTOR FOR PARTICULATE DESICCANT

[75] Inventor: Lanier Frantz, Salem, Va.

[73] Assignee: Graham-White Sales Corporation, Salem, Va.

[22] Filed: Feb. 25, 1976

[21] Appl. No.: 661,307

[52] U.S. Cl. .................... 55/218; 55/288; 55/316; 55/389; 55/475; 55/DIG. 17
[51] Int. Cl.² ........................ B01D 53/26
[58] Field of Search ............ 23/288 F; 55/316, 387, 55/389, 475, 218, 288, DIG. 17; 210/266, 283, 291, 350, 351

[56] References Cited

UNITED STATES PATENTS

| | | | |
|---|---|---|---|
| 2,838,795 | 6/1958 | Lockwood | 55/387 X |
| 3,278,031 | 10/1966 | Rosaen | 210/350 X |
| 3,353,339 | 11/1967 | Walter | 55/316 |
| 3,464,186 | 9/1969 | Hankison et al. | 55/387 X |
| 3,487,938 | 1/1970 | Patterson | 210/351 X |
| 3,628,314 | 12/1971 | McCarthy et al. | 55/387 |
| 3,838,977 | 10/1974 | Warren | 55/475 X |

*Primary Examiner*—Frank A. Spear, Jr.
*Assistant Examiner*—Robert H. Spitzer
*Attorney, Agent, or Firm*—Wilmer Mechlin

[57] ABSTRACT

Pneumatic compactor for compacting a particulate desiccant in a compressed gas filter unit, the compactor being automatically chargeable with the compressed gas during the unit's filter cycle and manually dischargeable during the unit's drain cycle.

10 Claims, 3 Drawing Figures

PNEUMATIC COMPACTOR FOR PARTICULATE DESICCANT

BACKGROUND OF THE INVENTION

The unique capability of molecular sieves for selective adsorption over a wide temperature range, particularly lend them for use in compressed gas filter units, where, because of the greater surface exposure to the gas, they are more effective in bead or other fine particle than in solid form. The drawback to the use of molecular sieve or other particulate desiccants in such filter units is that the particles, under flow of the compressed gas therethrough, abrade or rub against each other and produce dust, which, picked up by the gas, can detrimentally affect air brakes or other gas-operated devices when the product gas is so employed. At protracted intervals the particulate desiccant must be replaced and, to facilitate replacement, customarily is removably inserted in the housing of the filter unit. Heretofore, as disclosed in Hankison et al. U.S. Pat. Nos. 3,464,186 and 3,572,008 and the copending application of Virgil L. Frantz, Ser. No. 569,812, filed Apr. 21, 1975, dust-producing abrasion has been mitigated against by compacting the particles by a coil spring either precompressed or, as in Frantz, compressed by the insertion of the canister. In either case, the effective compacting force of the spring is initially limited by the resistance practically imposable on loading or insertion of the canister and is reduced as the particles settle. It is with these problems that the present invention is particularly concerned.

SUMMARY OF THE INVENTION

The primary object of the present invention is to provide in apparatus using a particulate desiccant in decontaminating a compressed gas, a pneumatic compactor charged with compressed gas for compacting the desiccant against dust-producing abrasion.

Another object of the invention is to provide in a compressed gas filter unit, a pneumatic compactor for compacting a particulate desiccant, which, when discharged or uncharged, is automatically charged with the compressed gas during the next filter cycle of the unit, is unaffected in its compacting force by any settlement of the desiccant and is manually dischargeable externally of the unit for enabling a canister containing the desiccant to be inserted and removed independently of the force exertable by the compactor when charged.

An additional object of the invention is to provide a desiccant-compacting pneumatic compactor which is readily includable in the unit and is protected against abrasion by being charged with clean air drawn from the unit.

Other objects and features of the invention will appear hereinafter in the detailed description, be particularly pointed out in the appended claims and be illustrated in the accompanying drawings, in which:

FIGURE DESCRIPTION

DETAILED DESCRIPTION

Figure 1:
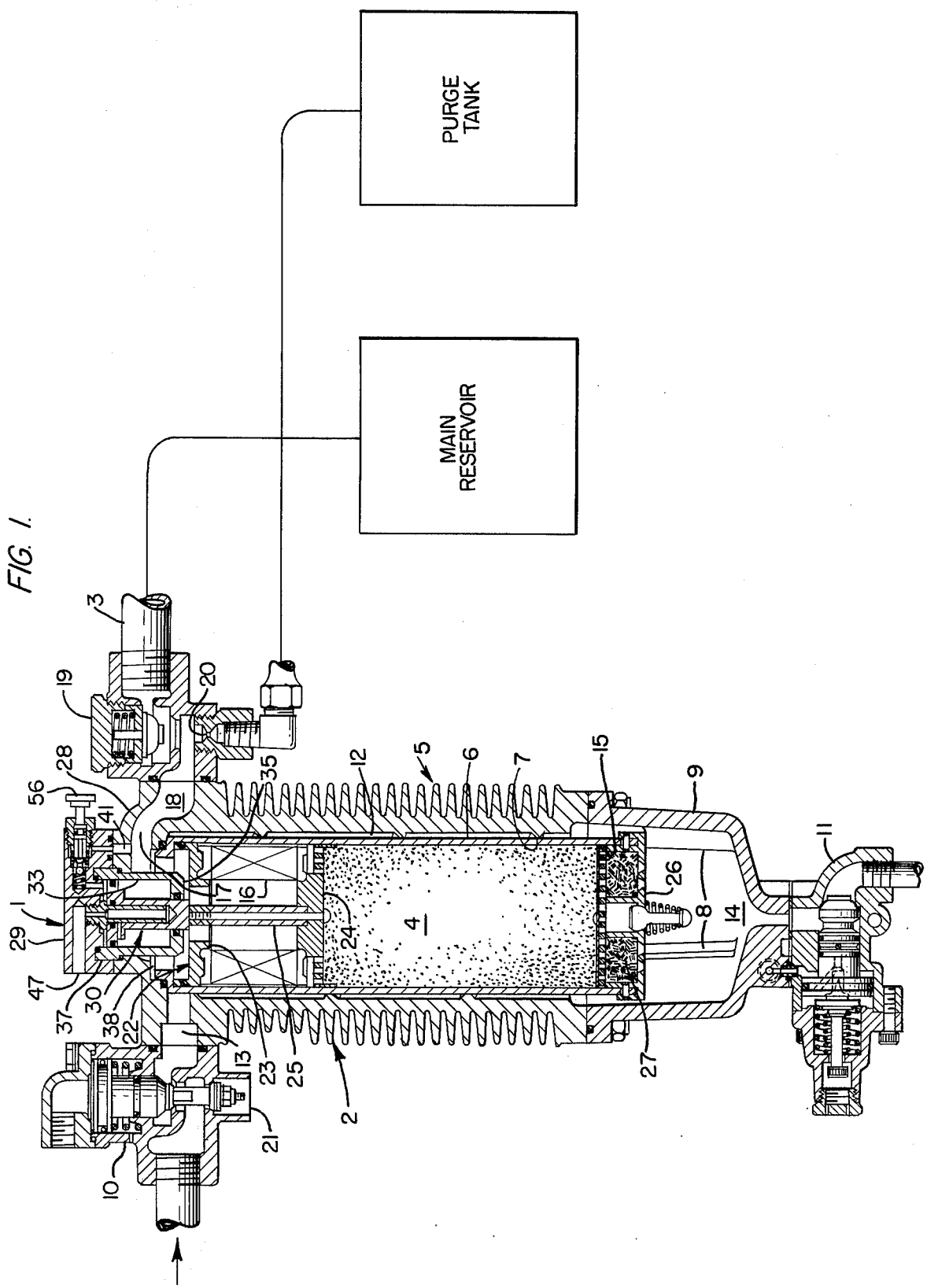
FIG. 1 is a side view of a compressed gas filter assembly similar to that of Frantz application Ser. No. 569,812, with main and purge reservoirs shown somewhat schematically and the filter unit shown in vertical section and incorporating a preferred embodiment of the pneumatic compactor of the present invention.
Figure 2:
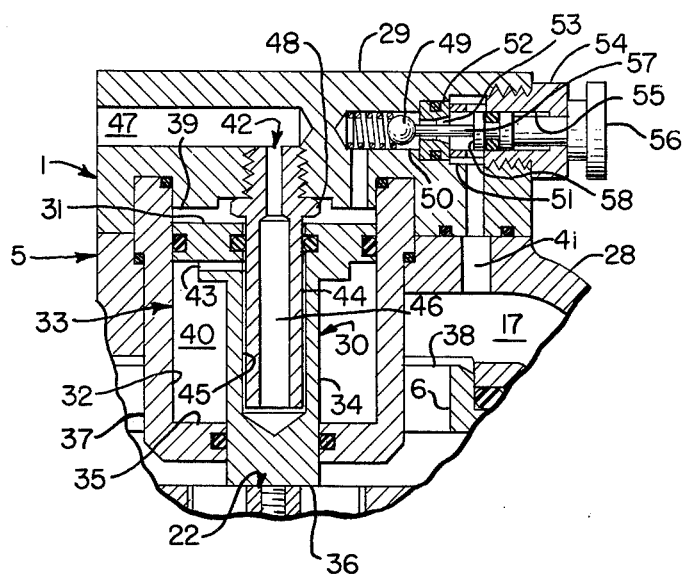
FIG. 2 is an enlarged view on the section of the filter unit of FIG. 1, of the pneumatic compactor removed from the unit and with the plunger in valve-opening position.
Figure 3:
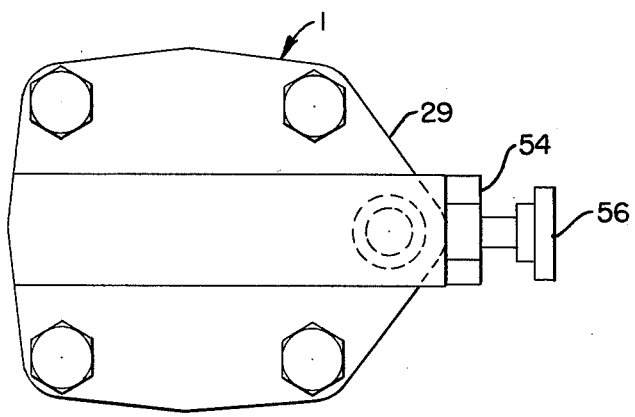
FIG. 3 is a top plan view of the compactor on the scale of FIG. 1.

Referring now in detail to the drawings in which like reference characters indicate like parts, the improved pneumatic compactor of the present invention is adapted to compact particulate material packed in a container and particularly designed for use in a compressed air or other gas filter unit for compacting a fine particle molecular sieve or other desiccant to inhibit or minimize the formation of dust by abrasion between the particles.

As exemplary of the invention, the improved pneumatic compactor, designated as 1, has been applied to or incorporated or installed in a separator-dryer or filter unit 2 of a compressed gas filter or decontaminating assembly 3, in which a compressed gas from a compressor or other suitable source (not shown), is passed through a bed or column of a particulate desiccant 4, preferably a fine bead or particle molecular sieve, for selectively adsorbing moisture or other entrained contaminant. Except for replacement of the customary coil compression spring by the pneumatic compactor 1 for compacting the desiccant, the filter unit 2 is similar in both structure and operation to the separator-dryer unit of the previously mentioned copending application Ser. No. 569,812 of Virgil L. Frantz. Thus, the filter unit 2 includes an externally finned upright housing 5, the particulate desiccant 4 is packed or contained in a cylindrical canister or cartridge 6 slidably received in a cylindrical central vertical bore 7 in the housing, and the canister in seated or inserted position rests or is supported on vertical ribs 8 integral with and instanding from a bowl 9 forming the lower part and bolted or otherwise removably attached to the main or upper part of the housing.

The filter unit 2 is adapted alternately to filter or separate contaminants from the compressed gas and drain or discharge separated contaminants from the housing 5 and is automatically synchronized in its filter or filtering and drain or draining cycles with the pumping and idling cycles, respectively, of the compressor, conveniently by having a normally open inlet valve 10 and normally closed drain valve 11, each shifting from normal condition or position in response to pressure in the compressor's governor line (not shown). With a helical or spiral passage 12 leading downwardly between confronting sides of the housing 5 and canister 6 from the housing's inlet port 13 to a sump 14 in the bowl 9, the filter unit 2, during a filtering cycle, is enabled to centrifugally separate heavier contaminants from and cool the compressed gas received through the inlet port, as well as to selectively adsorb moisture or other suitable entrained contaminant by the desiccant 4. In the same filtering cycle, the filter unit 2 can also duplicate the action of the corresponding unit of the above Frantz application in removing oil droplets and desiccant dust, if, as illustrated, it too contains in the canister 6 a scrubber 15 for oil droplets and a fine dust filter 16, respectively below or upstream and above or downstream of the desiccant bed 4. After being filtered, the gas from the canister 6 is discharged from the housing 5 through an outlet passage 17, outlet port 18 and outlet check valve 19 to a main reservoir and simultaneously, through a restricted orifice 20 of predetermined fixed area, to a purge reservoir or tank, both reservoirs being indicated by appropriately labeled boxes.

During the draining cycle of the filter unit 2, shifting of the inlet valve 10 from normal to closed position diverts hot gas generated by the then idling compressor from the housing 5 to atmosphere through an exhaust port 21 of the valve and causes the check valve 19 to close and block reentry of air from the main reservoir. However, opening of the drain valve 11 not only enables residual pressure in the housing 5 to force collected contaminants from the sump 14 through that valve, but, by the pressure drop in the housing, also causes a reverse flow of a large volume of low pressure filtered gas through the desiccant 4 from the purge tank through the intervening orifice 20, with consequent purging or regeneration of the desiccant.

While similar in the foregoing respects to the separator-dryer unit of Frantz application Ser. No. 569,812, even to including the fine dust filter 16, which here is of relatively less importance, the filter unit 2 represents a major advance over that application in the use of particulate desiccants in compressed gas filters in replacing the usual coil spring by the pneumatic compactor 1 for compacting the desiccant 4.

In the illustrated filter unit 2, the particulate desiccant 4 is compressed or compacted by the compacting force applied by the pneumatic compactor 1 between suitably rigid movable and stationary members, the former an upper or outer end follower 22 slidable or shiftable axially or longitudinally in the canister 6 and conveniently formed by the upper and lower end plates 23 and 24 and connecting spacer 25 mounting the dust filter 16, and the latter, the canister's bottom cap 26 backed by the supporting ribs 8 and incompressibly or non-yieldably containing the pad 27 of the scrubber 15.

To adsorb, the particulate desiccant 4 must be porous and thus is crushable, with aggravation of dust formation if the compacting force is sufficient to cause crushing. With this the maximum limit imposed on the compacting force, some relative movement of and abrasion between the desiccant particles is practically unavoidable from their exposure to flow of gas in both directions in the alternate adsorption and purging. Consequently, with time there will be settlement or consolidation of the desiccant bed, a factor for which a coil or other spring dependent for its force on precompression cannot compensate, since the force it can apply reduces progressively with elongation. Also, if, as in the Frantz application, the precompression is produced by the insertion of the canister 6, the compacting force exertable by a coil spring cannot be sufficient to interfere with the insertion, with the result that the effective maximum limit is around 25 lbs. While all of these factors apply to the use of a coil spring for compacting, the pneumatic compactor 1 enables the factors to be reduced to one, the maximum force the desiccant can withstand without being crushed.

Suitably mounted in the top of the filter unit 2, in the upper part of the housing 5 adjacent the outlet end of the bore 7, partly in the housing's upper end wall 28 and in balance in a cap, cover or casing 29 removably attached, as by bolting, to that wall, the pneumatic compactor or compacting spring 1 of the present invention is powered, charged, loaded or actuated by compressed gas, preferably the gas filtered in the filter unit. Also, the compactor 1 is manually dischargeable for freeing the desiccant of any compacting force, after discharge is automatically recharged in the next filtering cycle of the filter unit 2, and, while charged, applies during the filtering cycle a predetermined uniform compacting force on the desiccant regardless of any settlement of the latter.

The compactor 1 is comprised of a differential piston 30 preferably coaxial or concentric with and shiftable or reciprocable axially or longitudinally of the bore 7 in the housing 5. A larger, upper or outer head 31 of the piston 30 is contained in and slidably and sealingly engages a side wall 32 of a concentric cylindrical piston compartment or cavity 33 closed outwardly or upwardly by the cap 29. A stem 34 of the piston 30, integral with and of reduced cross-section relative to the larger head 31, projects or extends downwardly or inwardly from that head through a bottom wall 35 of the compartment 33 into the bore 7 and the canister 6 and has at its inner or lower end the piston's smaller head 36. Conveniently formed in a cylindrical-sided, suitably gasketed cup 37 extending into the cap 29 and seated in and extending through the top wall 28 into the open upper or outer end 38 of the canister 6, the piston compartment 33 is divided axially by the larger head 31 into upper or outer and lower or inner chambers 39 and 40, respectively. The upper chamber 39 serves as a pressure chamber normally containing or charged, for powering or actuating the piston 30, with compressed gas preferably drawn or supplied as filtered gas from the outlet passage 17 in the housing 5 during the filtering cycle of the unit 2 through a supply or connecting conduit or passage 41 extending through the top wall 28 and the intervening part of the cap 29.

Powered or actuated by the pressure of the gas in the pressure chamber 39 on its upper head 31, the piston applies or transmits the resultant compacting force to the particulate desiccant 4 through engagement or contact of its smaller head 36 with the upper or adjoining plate 23 of the floating follower 22, the lower plate 24 of which contains and spreads the applied force over the upper end of the desiccant column. To avoid opposition to actuation of the piston 30 by back pressure in the lower chamber 40, that chamber is vented at all times to atmosphere or ambient air through a multisection vent passage 42 formed, in sequence from the lower chamber, by a radial port 43 in the piston stem 34 below the larger head 31, a loose sliding fit between the piston and a concentric hollow guide post or column 44 received in a part-way axial bore 45 in the piston and anchored at the top in or suspended from the cap 29, an axial through-bore 46 of the guide post, and finally a vent port 47 in the cap. The preferred guide post 44 not only forms with the piston 30 part of the vent passage 42 and assists the cup 37 in guiding the piston, but has above the piston a radially outstanding shoulder, stop or abutment 48 for limiting its own projection into the cap 29 and fixing the minimum depth of the pressure chamber 39.

With flow through the supply conduit 41 normally limited to the supplying of compressed gas to the pressure chamber 39 from the outlet passage 17, suitably by a check valve 49 in a valve chamber 50 forming part of an intermediate or transverse leg 51 of the conduit, the pressure chamber not only is protected against accidental discharge during any draining cycle, but, if uncharged initially or intentionally discharged subsequently, will automatically be charged or loaded in the next filtering cycle of the filter unit 2 to the level of the pressure then in the outlet passage and, by the supply available during every filtering cycle, be maintained at that level regardless of any change in the chamber's volume. The compacting force the compactor 1 applies to the desiccant 4 with the pressure chamber 39 charged, thus will be constant or uniform over the range of movement of the piston 30 and not vary in accommodating or compensating automatically for any settlement of the desiccant. With the heads 31 and 36 of the piston 30 both exposed during a filtering cycle to the pressure of the gas passing through the housing 5, the compacting force applied by the compactor 1 will depend on the effective area or difference between the exposed areas of the heads of the piston and the gas pressure. Consequently, for truck and bus applications in which the gas pressure is usually around 120 p.s.i.g. (8.437 kg.s.cm.g.), an effective area as little as 1 sq. in. (6.452 sq. cm.) will produce a compacting force of about 120 pounds (54.43 kg.), far above the 25 pounds (11.34 kg.) of the usual coil spring but well below the force a desiccant column of the illustrated relatively large presented area can withstand without crushing.

The drastic increase in the compacting force obtainable with the compactor 1 is most desirable in reducing the dust produced by abrasion of the desiccant particles and that force, if present when the canister 6 is to be removed for periodic inspection and servicing, also will assist in the removal by acting to break loose and initiate ejection of the canister. However, the presence of the compacting force when a canister 6 is to be inserted in the housing 5, would not only interfere with but practically prevent the insertion. In the preferred compactor 1, provision therefore is made for discharging or unloading the compactor whenever desired and especially when a canister 6 is to be inserted in the housing 5, by dumping the actuating gas from the pressure chamber 39, either directly to atmosphere through suitable valving or, and preferably, by unseating the check valve 49 when the filter unit 2 is in its draining cycle or otherwise relieved of internal pressure.

The check valve 49, suitably a spring-pressed ball, conveniently is held in its chamber 50 by a collar, ring or annular seat 52 socketed in the cap 29 at the outer or supply end of the pressure chamber 39 and having an axial aperture or bore 53 therethrough which the check valve normally closes against reverse flow. Holding the collar 52 in place is a plug 54 concentric therewith and screwed into a side of the cap 29. The plug 54 slidably mounts in a cross-drilled axial cavity 55 an overriding or unloading plunger 56 having as its inner end portion a concentric pin 57 projectable, on depression, advance or inward movement of the plunger, through the aperture 53 to unseat the check valve 49. Also on the plunger 56 is an inwardly facing, outwardly gasketed shoulder 58 from which the pin 57 projects and which is so positioned axially of the transverse leg 51 of the supply conduit 41 as to be exposed to pressure from the outlet passage 17 through the intervening part of the supply conduit whenever the filter unit 2 is in a filtering cycle.

By limiting actuation, suitably manual, of the plunger 56 to any of the relatively protracted draining cycles of the filter unit 2, unseating of the check valve 49 enables the pressure in the pressure chamber 39 on the piston 30 to be dumped or unloaded, via the supply conduit 41 and canister 6, through the then open drain valve 11 and thus relieve or release the force otherwise available for compacting a particulate desiccant. Conversely, when the plunger 56 is released and the filter unit 2 begins its next filtering cycle, pressure from the outlet passage 17 on the shoulder 58 will act in an outward axial direction on and shift the plunger to retracted position and thereafter hold it in that position so that the check valve will automatically be reseated. As at joints between other parts of the compactor 1 where fluid leakage is undesirable, those between the plunger 56 and plug 54 and between the collar 52 and cap 29 are suitably gasketed, preferably by O-rings of appropriate size.

From the above detailed description it will be apparent that there has been provided an improved compactor for compacting a particulate desiccant in a unit for filtering compressed gas, which is pneumatically powered, suitably by compressed gas drawn after filtering from the unit to avoid clogging by otherwise entrained contaminants, is manually dischargeable to facilitate insertion of a container for the desiccant, after discharge or initially is automatically charged in the next filtering cycle of the unit, and is unaffected in its compacting force by any settlement of the desiccant. It should be understood that the described and disclosed embodiment is merely exemplary of the invention and that all modifications are intended to be included that do not depart from the spirit of the invention and the scope of the appended claims.

Having now described my invention, I claim:

1. In a compressed gas filter assembly, the combination, with a filter unit having a housing containing a particulate desiccant for adsorbing a contaminant from compressed gas passing therethrough during a filtering cycle of the unit, of a pneumatic compactor comprising piston means actuated by compressed gas for applying a compacting force to the desiccant, and valve means normally preventing release of actuating gas from said piston means during a draining cycle of said unit.

2. The combination of claim 1, wherein the compressed gas actuating the piston means is gas filtered by the filter unit.

3. The combination of claim 1, wherein the valve means are selectively actuatable for releasing said actuating gas and the compacting force applied by the piston means to the desiccant.

4. The combination of claim 3, wherein the valve means are check valve means in a conduit for supplying the actuating gas to the piston means, and including manually actuatable means for selectively unseating said check valve means.

5. The combination of claim 4, wherein the particulate desiccant is contained in a bore of the housing, the piston means projects into and is shiftable axially of said bore, the supply conduit extends between an actuating gas pressure chamber for the piston means and an outlet passage in said housing downstream of said bore, and the check valve means is automatically openable for passing filtered compressed gas as needed to said pressure chamber during a filtering cycle of the filter unit.

6. The combination of claim 5, wherein the compactor is mounted on said housing adjacent an outlet end of said bore and includes a piston compartment coaxial with said bore, the piston means is a differential piston having a larger head in and dividing said compartment axially into said pressure and atmospherically vented chambers respectively outwardly and inwardly of said head, and a smaller head on the piston inwardly of said compartment for applying the compacting force to the desiccant.

7. The combination of claim 5, wherein the manually actuatable means is a plunger projecting into the supply conduit in advance of and projectable against the check valve for selective unseating thereof, and means on said plunger and responsive to pressure from said outlet passage for shifting said plunger to retracted position during the filtering cycle of the filter unit.

8. The combination of claim 6, including a hollow guide post extending inwardly into the piston compartment and coaxial with and loosely received in the piston for assisting in guiding the piston and venting the vented chamber to atmosphere.

9. The combination of claim 6, including a canister removably seated in the bore and containing the desiccant, and a floating follower in said canister downstream of the desiccant for transmitting the compacting force thereto from the piston.

10. In a compressed gas filter assembly, the combination, with a particulate desiccant alternately adsorbing a contaminant from compressed gas passing therethrough and regenerated by a reverse flow of filtered gas therethrough respectively during filtering and draining cycles of said unit, of a pneumatic compactor mounted on a housing of said unit and chargeable with compressed gas for applying a compacting force to said desiccant, means for automatically charging said compactor with filtered compressed gas during a filtering cycle of said unit, valve means normally preventing discharging of said compactor during a draining cycle of said unit, and manually actuatable means selectively actable on said valve means during a draining cycle of said unit for discharging said compactor and releasing said compacting force thereof on said desiccant.

* * * * *